United States Patent
Liu et al.

(10) Patent No.: US 9,928,811 B2
(45) Date of Patent: Mar. 27, 2018

(54) METHODS, DEVICES, AND COMPUTER-READABLE STORAGE MEDIUM FOR IMAGE DISPLAY

(71) Applicant: XIAOMI INC., Haidian District, Beijing (CN)

(72) Inventors: Anyu Liu, Beijing (CN); Guosheng Li, Beijing (CN); Zhongsheng Jiang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/352,371

(22) Filed: Nov. 15, 2016

(65) Prior Publication Data
US 2017/0148421 A1    May 25, 2017

(30) Foreign Application Priority Data

Nov. 24, 2015 (CN) .......................... 2015 1 0824212

(51) Int. Cl.
*G09G 5/391* (2006.01)
*G09G 5/00* (2006.01)

(52) U.S. Cl.
CPC ............. *G09G 5/391* (2013.01); *G09G 5/005* (2013.01); *G09G 2340/02* (2013.01)

(58) Field of Classification Search
None
See application file for complete search history.

(56) References Cited

U.S. PATENT DOCUMENTS

| | | | |
|---|---|---|---|
| 6,804,451 | B1 | 10/2004 | Ko et al. |
| 7,454,122 | B2 | 11/2008 | Ko et al. |
| 7,558,319 | B2 | 7/2009 | Okada et al. |
| 2003/0161010 | A1 | 8/2003 | Schinner |
| 2004/0008770 | A1 | 1/2004 | Okada et al. |
| 2004/0223732 | A1 | 11/2004 | Ko et al. |
| 2012/0183073 | A1 | 7/2012 | Milstein |
| 2013/0100121 | A1 | 4/2013 | Cha |

(Continued)

FOREIGN PATENT DOCUMENTS

| | | |
|---|---|---|
| CN | 1445990 A | 10/2003 |
| CN | 1469645 A | 1/2004 |
| CN | 1497940 A | 5/2004 |

(Continued)

OTHER PUBLICATIONS

International Search Report for International Application No. PCT/CN2016/100067 with translation, dated Dec. 30, 2016, 14 pages.

(Continued)

*Primary Examiner* — Michelle Chin

(57) ABSTRACT

A method, device, and computer-readable storage medium are provided for image display. The method includes: obtaining display definition information of an image to be displayed; determining a target image compression ratio corresponding to the display definition information of the image to be displayed based on a prestored correspondence between display definition information and image compression ratios; and compressing display data of the image to be displayed based on the target image compression ratio, and transmitting the compressed display data to a display device for display.

18 Claims, 5 Drawing Sheets

(56) References Cited

U.S. PATENT DOCUMENTS

2016/0071313 A1* 3/2016 Laine .................... G06T 15/10
                                                    345/419

FOREIGN PATENT DOCUMENTS

| CN | 1747536 A | 3/2006 |
| CN | 101030365 A | 9/2007 |
| CN | 103065604 A | 4/2013 |
| CN | 105489194 A | 4/2016 |
| EP | 0 487 282 A2 | 5/1992 |

OTHER PUBLICATIONS

Extended European Search Report for European Application No. 16199273.0, dated Mar. 24, 2017, 12 pages.
First Office Action (including English translation) issued in corresponding Chinese Patent Application No. 201510824212.6, dated Aug. 18, 2017, 19 pages.

* cited by examiner

If the target image compression ratio is not 1:

If the target image compression ratio is 1:

METHODS, DEVICES, AND COMPUTER-READABLE STORAGE MEDIUM FOR IMAGE DISPLAY

CROSS-REFERENCE TO RELATED APPLICATION

This application is based on and claims priority to Chinese Patent Application No. 201510824212.6, filed on Nov. 24, 2015, which is incorporated herein by reference in its entirety.

FIELD

The present disclosure relates to a technical field of computer, and more particularly, to methods, devices, and computer-readable storage medium for image display.

BACKGROUND

With the development of electronic technology, terminals, such as mobile phones, tablets and the like, have been widely used. Generally, the terminals are equipped with a display device and a graphics processor.

During use of a terminal, the graphics processor may obtain the display data required to be output by the display device, compress and transmit the display data to the display device and save it to a cache space of the display device, then the display device may retrieve and decompress the display data in the cache space, and may be driven to display the corresponding image based on the display data.

During implementation of the present disclosure, there exist at least the following problems, which are found by the inventors.

When being compressed, generally, the display data may be selected to be compressed at a minimum level or not be compressed if the capacity of the cache space permits. The display data compressed at a low level has a large data size, correspondingly, the data size to be transmitted is large too, so the terminal takes more power during image display.

SUMMARY

In order to solve the problem in related arts, a method, device and computer-readable storage medium for image display are provided by the present disclosure. The technical solutions are as follows.

According to a first aspect of the present disclosure, a method for image display is provided. The method may include: obtaining display definition information of an image to be displayed; determining a target image compression ratio corresponding to the display definition information of the image to be displayed based on a prestored correspondence between display definition information and image compression ratios; and compressing display data of the image to be displayed based on the target image compression ratio, and transmitting the compressed display data to a display device for display.

According to a second aspect of the present disclosure, a device for image display is provided. The device may include: an obtaining module configured to obtain display definition information of an image to be displayed; a determination module configured to determine a target image compression ratio corresponding to the display definition information of the image to be displayed based on a prestored correspondence between display definition information and image compression ratios; and a compression module configured to compress display data of the image to be displayed based on the target image compression ratio, and transmit the compressed display data to a display device for display.

According to a third aspect of the present disclosure, a device for image display is provided. The device may include: a processor; a memory for storing instructions, which are executable by the processor; wherein the processor is configured to: obtain display definition information of an image to be displayed; determine a target image compression ratio corresponding to the display definition information of the image to be displayed based on a prestored correspondence between display definition information and image compression ratios; and compress display data of the image to be displayed based on the target image compression ratio, and transmit the compressed display data to a display device for display.

According to a fourth aspect of the present disclosure, there is provided a non-transitory computer-readable storage medium having stored therein instructions that, when executed by a processor of a device, causes the device to perform acts for image display. The acts may include: obtaining display definition information of an image to be displayed; determining a target image compression ratio corresponding to the display definition information of the image to be displayed based on a prestored correspondence between display definition information and image compression ratios; and compressing display data of the image to be displayed based on the target image compression ratio, and transmitting the compressed display data to a display device for display.

It is to be understood that the above general description and the following detailed description are merely for the purpose of illustration and explanation, and are not intended to limit the scope of the protection of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

By the above drawings, precise embodiments of the present disclosure have been shown, and will be described in more detail hereinafter. These figures and description are not intended in any way to limit the scope of the disclosed concept, but to explain concept described in this disclosure to those skilled in the art by reference to specific embodiments.

DETAILED DESCRIPTION

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Reference will now be made in detail to example embodiments, examples of which are illustrated in the accompanying drawings. The following description refers to the accompanying drawings in which same numbers in different drawings represent same or similar elements unless otherwise described. The implementations set forth in the following description of example embodiments do not represent all implementations consistent with the present disclosure. Instead, they are merely examples of devices and methods consistent with aspects related to the present disclosure as recited in the appended claims.

Figure 1:
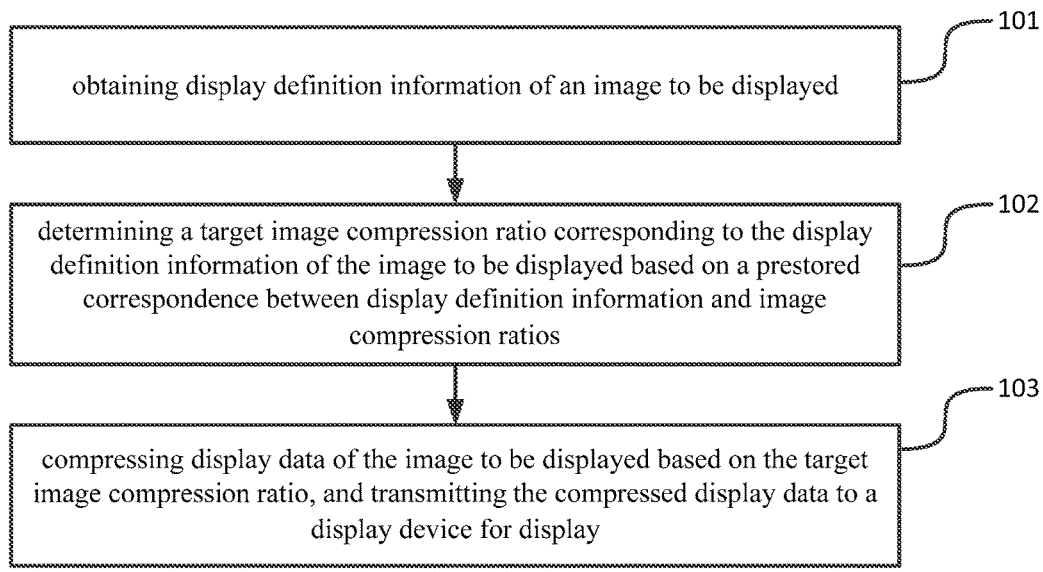
FIG. 1 is a flow diagram illustrating a method for image display according to an exemplary embodiment.

The present disclosure provides a method for image display according to an exemplary embodiment, as shown in FIG. 1, the processing procedure of the method may include following steps.

In step 101, display definition information of an image to be displayed is obtained.

In step 102, a target image compression ratio corresponding to the display definition information of the image to be displayed is determined based on a prestored correspondence between display definition information and image compression ratios.

In step 103, display data of the image to be displayed is compressed based on the target image compression ratio, and the compressed display data is transmitted to a display device for display.

Embodiments of the present disclosure may include obtaining display definition information of an image to be displayed; determining a target image compression ratio corresponding to the display definition information of the image to be displayed based on a prestored correspondence between display definition information and image compression ratios; and compressing display data of the image to be displayed based on the target image compression ratio, and transmitting the compressed display data to a display device for display. Thus, users may select to compress the display data in a higher level when there is no need for a high image quality, so as to reduce the size of the data to be transmitted, which may reduce the power consumption for image display.

The present disclosure provides a method for image display according to another exemplary embodiment, which may be implemented by a terminal. The terminal may be a device capable of image display, for example, a mobile phone, a tablet, and the like. The terminal may include a graphics processor and a display device which are electrically connected with each other. The graphics processor is used for processing image to generate display data of the image to be displayed, and the display device may include a display drive integrated circuit (IC) and a Liquid Crystal Display Module (LCM) which are electrically connected with each other.

Figure 2A:
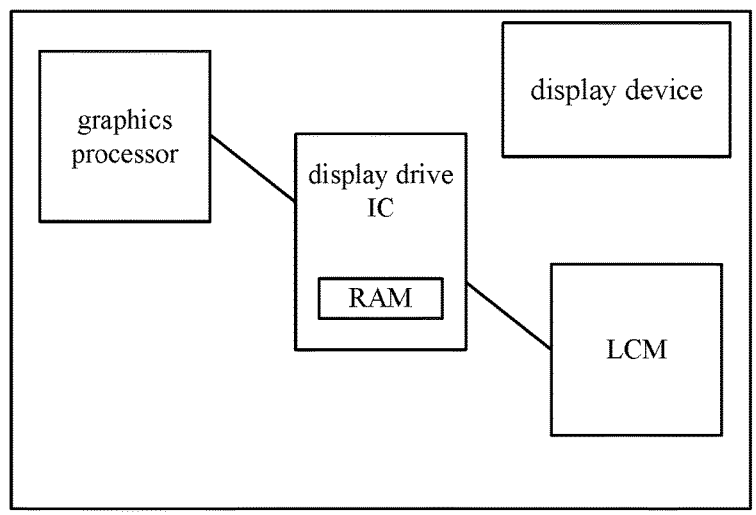
FIG. 2A is a structure diagram illustrating a display device according to an exemplary embodiment.

FIG. 2A is a structure diagram illustrating a display device according to one or more embodiments. The display drive IC may be equipped with a random access memory (RAM), as shown in FIG. 2A, the display drive IC may control the LCM for image display based on the display data, the RAM may store the display data, and the LCM may display the image to be displayed. The terminal may further include an input unit used for inputting instructions by users in the process of image display. In the embodiment, a mobile phone is taken as an example for detailed description of the solution, and the other situations are similar to this, which will not be elaborated herein.

The processing procedure shown in FIG. 1 is illustrated in detail in conjunction with implementation, which has the following contents.

In step 101, display definition information of an image to be displayed is obtained.

The image to be displayed may include an image that is instructed to be displayed on the terminal display interface by the display device.

In implementation, the display device of the terminal is in an on state, the graphics processor may keep sending image frames (the image frames of the images to be displayed), and the frequency of the image frames is a preset frequency for screen refresh, e.g., 60 Hz. Before sending the image frames, the graphics processor may obtain the display definition information of the images to be displayed, and the display definition information may be a display definition level, e.g., super definition, high definition, standard definition and the like. The display definition level may be set up by users or may be determined by the resolution of the image or video on the terminal interface.

Alternatively, the display definition information may be a display definition level, correspondingly, step 101 may have various processing modes, for example, there are two kinds of optional processing modes which are provided as follows.

Mode 1: obtaining an original resolution of the image to be displayed; determining, based on the prestored correspondence between display definition information and image compression ratios, a display definition level corresponding to a resolution range including the original resolution as the display definition level of the image to be displayed.

The original resolution refers to the resolution of the image or video being displayed currently on the terminal interface.

In implementation, the terminal may prestore the correspondence between display definition information and image compression ratios. For example, the resolution of 640*480 and under corresponds to a lowest display definition level; the resolution in the range of 640*480 to 1024*768 corresponds to a second lowest display definition level; the resolution in the range of 1024*768 to 1600*1200 corresponds to a middle display definition level and so on. Generally, the higher the definition value in the definition range is, the higher the corresponding display definition level is. When the user need view image or play video, that is, after the terminal receives an image display instruction, the original resolution of the image to be displayed may be obtained. Next, a resolution range including the original resolution may be determined in the above described correspondence, such that the display definition level corresponding to the image to be displayed is determined as the display definition information.

Mode 2: obtaining the display definition level of the image to be displayed chosen by a user.

In implementation, when a user need view image or play video, he or she may click manually to select the display definition level of the image or video, for example, normal definition, standard definition, high definition, super definition and the like. Then the terminal may receive a selection instruction for the display definition level, so that it may obtain the display definition level of the image to be displayed from the selection instruction as the display definition information.

In step 102, a target image compression ratio corresponding to the display definition information of the image to be displayed is determined based on a prestored correspondence between display definition information and image compression ratios.

In implementation, the above described correspondence may be preset in the system program or the drive program of the graphics processor by the developer of the system program. Further, users may adjust the content of the correspondence by themselves. The corresponding setting mode will be described in details later. In the correspondence, the definition corresponding to the display definition information may be set to be inversely proportional to the image compression ratio, that is, the higher the display definition level is, the lower the corresponding image compression ratio is, and the lower the display definition level is, the higher the corresponding image compression ratio is. In the correspondence, one display definition level corresponds to one image compression ratio, or multiple display definition levels correspond to one image compression ratio. After obtaining the display definition information of the image to be displayed, the terminal may look up and determine the corresponding image compression ratio in the above described correspondence.

In step 103, display data of the image to be displayed is compressed based on the target image compression ratio, and the compressed display data is transmitted to a display device for display.

The display data of the image to be displayed is generated by converting the color channel value of each pixel point of the image to be displayed by the terminal, and is used for driving the display device to display the data of the image to be displayed, for example, the voltage value of the driving voltage of each pixel point on the display device.

In implementation, the display data of the content to be displayed by the terminal may be obtained through the image processing by the graphics processor, and then the display data may be compressed based on the target image compression ratio determined in step 102, next, the compressed display data may be transmitted to the display device, such that the display drive IC in the display device may drive the LCM to display the image to be displayed based on the decompressed display data.

Alternatively, before displaying the image to be displayed, the display device may cache the corresponding display data, correspondingly, the processing of step 103 is as follows: saving the compressed display data to a cache (i.e., RAM) of the display device; retrieving the compressed display data from the cache and decompressing the compressed display data; and driving the display device to display the image to be displayed based on the decompressed display data.

In implementation, the display device of the terminal may be equipped with a cache (i.e., RAM) for storing display data. When the compressed display data is transmitted to the display data, the terminal may save the compressed display data to the cache of the display device firstly, and when it's instructed to display the corresponding frame image, the terminal may retrieve the compressed display data from the cache and decompress the compressed display data, so as to drive, by the display drive IC, the LCM to display the frame image based on the decompressed display data. It should be noted that the capacity of the cache of the display device may be relatively small due to cost. In general, the cache may store at most the display data of one frame of uncompressed image to be displayed. Thus, when the capacity of the cache is not enough to store the display data of one frame of uncompressed image to be displayed, the display device may need to compress the display data, so as to enable the display data of the one frame of image to be displayed to be stored in the cache of the display device. However, during storage, the terminal may save, in turn, the display data of all frames of images to be displayed to the cache of the display device in frames, when the current display data in the cache is retrieved, the display data of the next frame may be saved. If it's detected that the current display data in the cache is the same with that of the next frame, keep the display data in the cache and drop the display data of the next frame, such that there is no need to re-drive the LCM based on the new display data.

Alternatively, when the display definition information shows a highest display definition level, the display data may be compressed in a lowest level or not be compressed. Correspondingly, the processing of step 102 may include: determining the target image compression ratio corresponding to the display definition information of the image to be displayed as 1, if the display definition information of the image to be displayed is a highest display definition level and capacity of the cache of the display device is greater than or equal to a frame data size of the display data; and determining the target image compression ratio corresponding to the display definition information of the image to be displayed as a ratio of the capacity of the cache of the display device to the frame data size of the display data, if the display definition information of the image to be displayed is the highest display definition level and the capacity of the cache of the display device is less than the frame data size of the display data.

The frame data size refers to the size of the data of each frame of image to be displayed.

In implementation, when the display definition information of the image to be displayed obtained by the terminal is the highest definition level, if the capacity of the cache of the display device is greater than or equal to the frame data size of the display data, the target image compression ratio of the image to be displayed may be determined as 1, that is, the display data of the image to be displayed will not be compressed; if the capacity of the cache of the display device is less than the frame data size of the display data, the target image compression ratio corresponding to the display definition information of the image to be displayed may be determined as a ratio of the capacity of the cache of the display device to the frame data size of the display data, that is, the display data of the image to be displayed may be compressed in a lowest level, so as to enable the cache of the display device to save the display data of one frame.

Alternatively, when there's no need to compress the display data of the image to be displayed, the display data may not be saved, the corresponding processing is as follows: if the target image compression ratio is not 1, compressing the display data of the image to be displayed based on the target image compression ratio; saving the compressed display data to the cache of the display device; retrieving the compressed display data from the cache and decompressing the compressed display data; and driving the display device to display the image to be displayed based on the decompressed display data; if the target image compression ratio is 1, driving the display device to display the image to be displayed based directly on the display data of the image to be displayed.

Figure 2B:
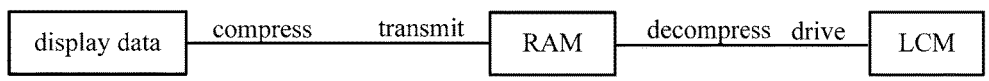
FIG. 2B is a flow diagram illustrating a method for image display according to an exemplary embodiment.
Figure 2B:
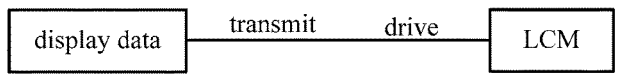

FIG. 2B is a flow diagram illustrating a method for image display according to one or more embodiments. For example, when the target image compression ratio is not 1, the terminal may compress the display data of the image to be displayed based on the target image compression ratio, and then transmit the compressed display data to the display drive IC. Next, the terminal may save the compressed display data to the cache of the display device firstly. When the corresponding frame of image is to be displayed, the terminal retrieves the compressed display data of the frame of image and decompresses it, such that the terminal may drive the LCM to display the frame of image by the display drive IC based on the decompressed display data.

However, when the target image compression ratio is 1, that is, there's no need to compress the display data, the terminal may not cache the display data but directly drive, by the display drive IC of the display device, the LCM to display the frame of image based on the display data of the image to be displayed, the corresponding processing procedure is as shown in FIG. 2B.

Alternatively or additionally, an example correspondence in step 102 is as follows.

The target image compression ratio corresponding to the display definition information of the image to be displayed is determined as a preset low compression ratio, if the display definition information of the image to be displayed is a second display definition level; the target image compression ratio corresponding to the display definition information of the image to be displayed is determined as a preset middle compression ratio, if the display definition information of the image to be displayed is a third display definition level; and the target image compression ratio corresponding to the display definition information of the image to be displayed is determined as a preset high compression ratio, if the display definition information of the image to be displayed is a fourth display definition level; wherein the highest display definition level is higher than the second display definition level, the second display definition level is higher than the third display definition level, and the third display definition level is higher than the fourth display definition level.

The above described correspondence divides the display definition information of the image to be displayed into four levels, which correspond to four compression levels. However, the correspondence involved in this scheme is not limited to the four levels, and the number of levels may be set or adjusted by users or developers.

The disclosure further provides a method for setting the correspondence between display definition information and image compression ratios by users themselves, the method may include: receiving a request for setting a compression ratio, the request for setting the compression ratio carries display definition information to be set and an image compression ratio to be set; and updating the correspondence between display definition information and image compression ratios based on the display definition information to be set and the image compression ratio to be set.

In implementation, a user may click a system setup button and open a setup interface shown the correspondence between display definition information and image compression ratios, and the current correspondence may be displayed on the setup interface. The user then may click the display definition information or the image compression ratios to be modified in the correspondence, input new contents, and click a setup finish button, then the terminal may receive a request for setting the compression ratio, and update the above described correspondence based on the request for setting the compression ratio. For example, if the user want to modify the image compression ratio corresponding to the second display definition level to 1, he or she may click the corresponding location in the correspondence chart and input "1", and after the user finishing the input and clicking the setup finish button, the terminal can store the second display definition level and the image compression ratio of 1 correspondingly, and update the original correspondence. The processing procedure for modifying the display definition information is the same as the above described processing procedure, which will not be repeated herein.

Embodiments of the present disclosure may include obtaining display definition information of an image to be displayed; determining a target image compression ratio corresponding to the display definition information of the image to be displayed based on a prestored correspondence between display definition information and image compression ratios; and compressing display data of the image to be displayed based on the target image compression ratio, and transmitting the compressed display data to a display device for display. Thus, users may select to compress the display data in a higher level when there is no need for a high image quality, so as to reduce the size of the data to be transmitted, which may reduce the power consumption for image display.

Figure 3:
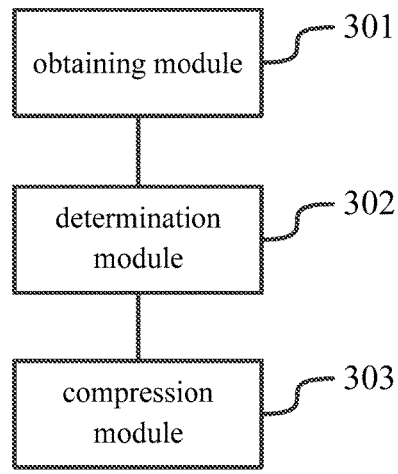
FIG. 3 is a schematic diagram illustrating a device for image display according to an exemplary embodiment.

Based on the same technical conception, the present disclosure provides a device for image display according to anther exemplary embodiment. As shown in FIG. 3, the device may include: an obtaining module 301, a determination module 302 and a compression module 303.

The obtaining module 301 is configured to obtain display definition information of an image to be displayed.

The determination module 302 is configured to determine a target image compression ratio corresponding to the display definition information of the image to be displayed based on a prestored correspondence between display definition information and image compression ratios.

The compression module 303 is configured to compress display data of the image to be displayed based on the target image compression ratio, and transmit the compressed display data to a display device for display.

Figure 4:
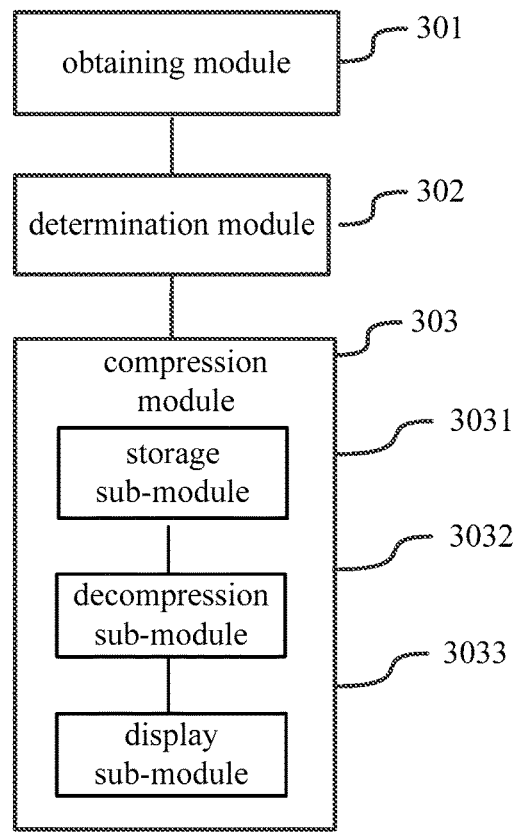
FIG. 4 is a schematic diagram illustrating a device for image display according to an exemplary embodiment.

Alternatively, as shown in FIG. 4, the compression module 303 may include: a storage sub-module 3031 configured to save the compressed display data to a cache of the display device; a decompression sub-module 3032 configured to retrieve the compressed display data from the cache and decompress the compressed display data; and a display sub-module 3033 configured to drive the display device to display the image to be displayed based on the decompressed display data.

Alternatively, the display definition information is a display definition level; the obtaining module 301 is configured to: obtain an original resolution of the image to be displayed; determine, based on the prestored correspondence between display definition information and image compression ratios, a display definition level corresponding to a resolution range including the original resolution as the display definition level of the image to be displayed; or obtain the display definition level of the image to be displayed chosen by a user.

Alternatively, the determination module 302 is configured to: determine the target image compression ratio corresponding to the display definition information of the image to be displayed as 1, if the display definition information of the image to be displayed is a highest display definition level and capacity of the cache of the display device is greater than or equal to a frame data size of the display data; and determine the target image compression ratio corresponding to the display definition information of the image to be displayed as a ratio of the capacity of the cache of the display device to the frame data size of the display data, if the display definition information of the image to be displayed is the highest display definition level and the capacity of the cache of the display device is less than the frame data size of the display data.

Alternatively, the compression module 303 is configured to: if the target image compression ratio is not 1, compress the display data of the image to be displayed based on the target image compression ratio; save the compressed display data to the cache of the display device; retrieve the compressed display data from the cache and decompress the compressed display data; and drive the display device to display the image to be displayed based on the decompressed display data.

Figure 5:
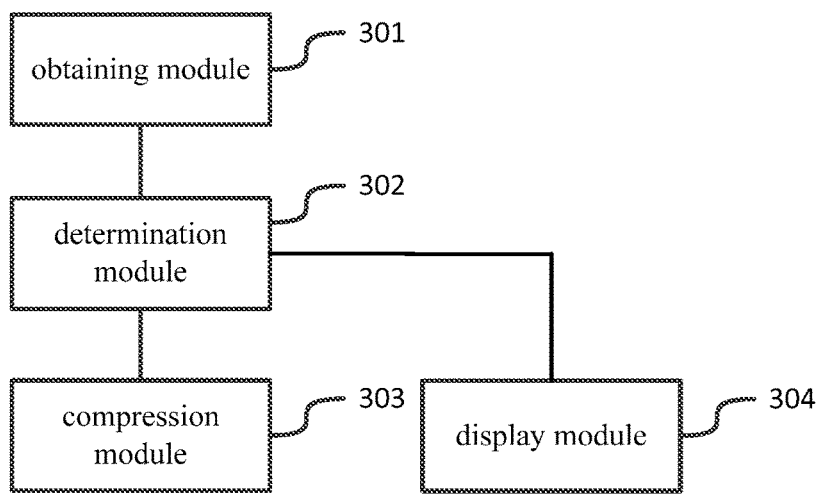
FIG. 5 is a schematic diagram illustrating a device for image display according to an exemplary embodiment.

As shown in FIG. 5, the device may further include: a display module 304 configured to drive the display device to display the image to be displayed based directly on the display data of the image to be displayed if the target image compression ratio is 1. The display module 304 may include a display driver circuit or other circuitries to drive the display device.

Alternatively, the determination module 302 is further configured to: determine the target image compression ratio corresponding to the display definition information of the image to be displayed as a preset low compression ratio, if the display definition information of the image to be displayed is a second display definition level; determine the target image compression ratio corresponding to the display definition information of the image to be displayed as a preset middle compression ratio, if the display definition information of the image to be displayed is a third display definition level; and determine the target image compression ratio corresponding to the display definition information of the image to be displayed as a preset high compression ratio, if the display definition information of the image to be displayed is a fourth display definition level; wherein the highest display definition level is higher than the second display definition level, the second display definition level is higher than the third display definition level, and the third display definition level is higher than the fourth display definition level.

Figure 6:
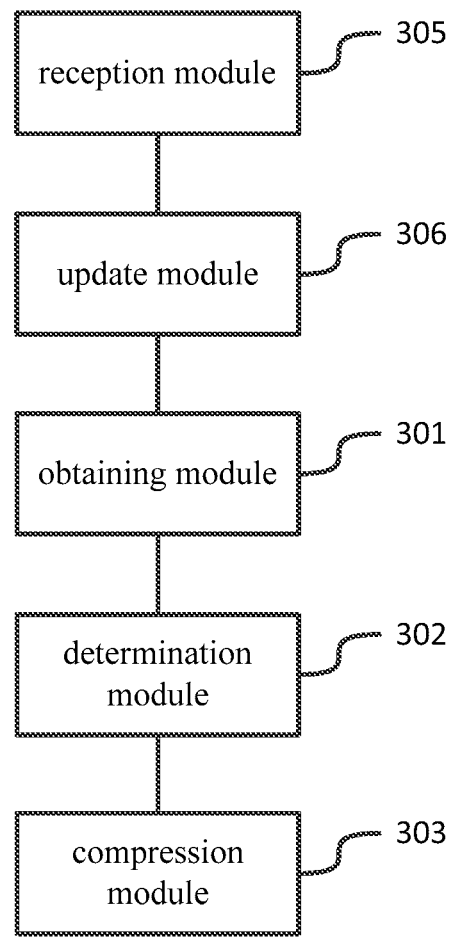
FIG. 6 is a schematic diagram illustrating a device for image display according to an exemplary embodiment.

Alternatively, as shown in FIG. 6, the device may further include: a reception module 305 configured to receive a request for setting a compression ratio, the request for setting the compression ratio carries display definition information to be set and an image compression ratio to be set; and an update module 306 configured to update the correspondence between display definition information and image compression ratios based on the display definition information to be set and the image compression ratio to be set.

With respect to the devices in the above embodiments, the specific manners for performing operations for individual modules therein have been described in detail in the embodiments regarding the method, which will not be elaborated herein.

Embodiments of the present disclosure may include obtaining display definition information of an image to be displayed; determining a target image compression ratio corresponding to the display definition information of the image to be displayed based on a prestored correspondence between display definition information and image compression ratios; and compressing display data of the image to be displayed based on the target image compression ratio, and transmitting the compressed display data to a display device for display. Thus, users may select to compress the display data in a higher level when there is no need for a high image quality, so as to reduce the size of the data to be transmitted, which may reduce the power consumption for image display.

It should be noted that the above embodiment only illustrates the division of the functional modules when the device for image display provided by the embodiment processes the communication message. In practical applications, the functions described above may be allocated to different modules to be completed. For example, the internal structure of the device may be divided into different modules to complete part or all of the functions described above. In addition, the device for image display and the method for image display pertain to a same concept, and the specific implementation of the device refers to method embodiment, which will not be elaborated herein.

The present disclosure further provides a structure diagram illustrating a terminal according to an exemplary embodiment. The terminal may be a mobile phone and the like.

Figure 7:
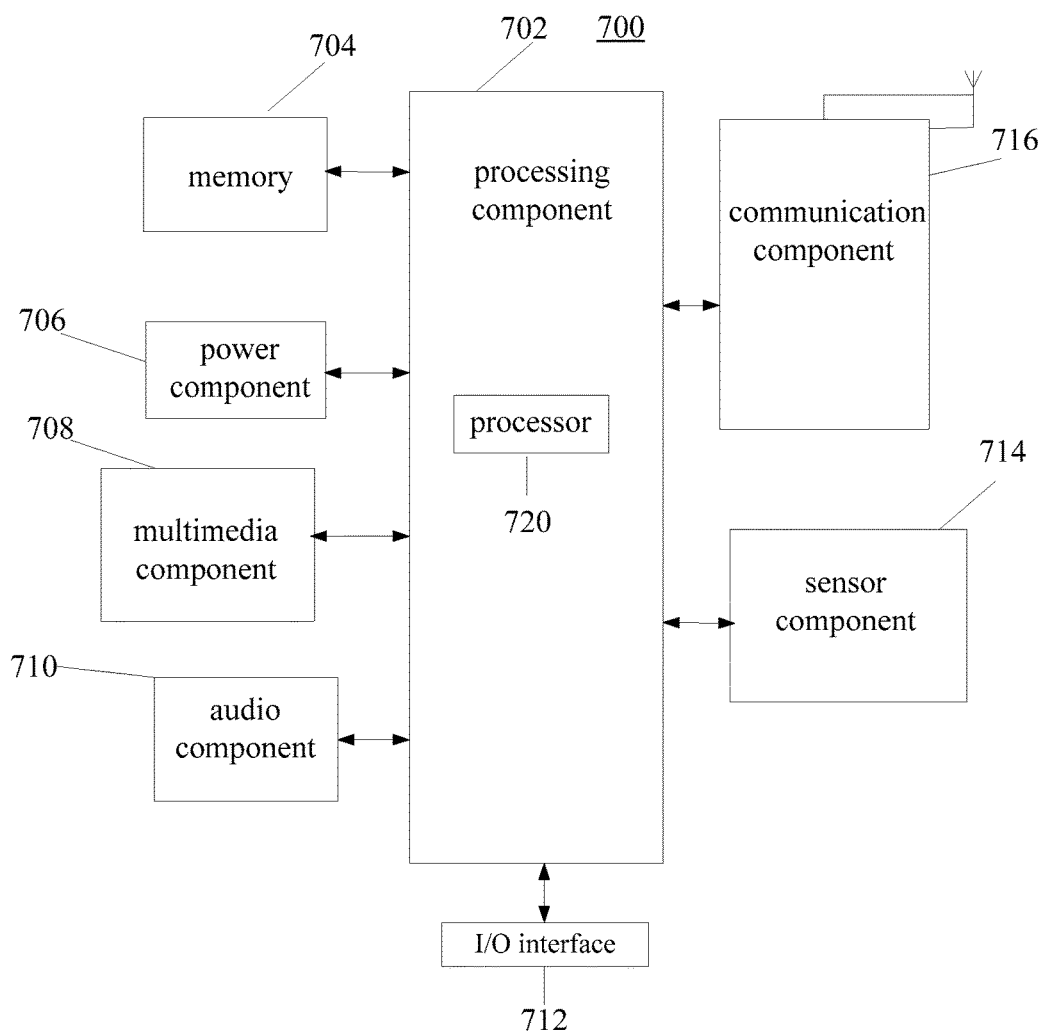
FIG. 7 is a structure diagram illustrating a terminal according to an exemplary embodiment.

Referring to FIG. 7, the terminal 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. The one or more processors 720 may include at least one graphics processor. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data may include instructions for any applications or methods operated on the terminal 700, contact data, phonebook data, messages, pictures, video, etc. The memory 704 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the terminal 700. The power component 706 may include a power management system, one or more power sources, and any other components associated with the generation, management, and distribution of power in the terminal 700.

The multimedia component 708 includes a screen providing an output interface between the terminal 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also detect a period of time and a pressure associated with the touch or swipe action. In some embodiments, the multimedia component 708 includes a front camera and/or a rear camera. The front camera and/or the rear camera may receive an external multimedia datum while the terminal 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the terminal 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the terminal 700. For instance, the sensor component 714 may detect an open/closed status of the terminal 700, relative positioning of components, e.g., the display and the keypad, of the terminal 700, a change in position of the terminal 700 or a component of the terminal 700, a presence or absence of user contact with the terminal 700, an orientation or an acceleration/deceleration of the terminal 700, and a change in temperature of the terminal 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a distance sensor, a pressure sensor, or a temperature sensor.

The communication component 716 is configured to facilitate communication, wired or wirelessly, between the terminal 700 and other devices. The terminal 700 can access a wireless network based on a communication standard, such as WiFi, 2G, 3G, 4G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 700 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit in the disclosure may be implemented at least partially using the one or more circuitries.

In exemplary embodiments, there is also provided a non-transitory computer-readable storage medium including instructions, such as the memory 704 including instructions executable by the processor 720 in the terminal 700 to perform the above-described methods. For example, the non-transitory computer-readable storage medium may be a ROM, a RAM, a CD-ROM, a magnetic tape, a floppy disc, an optical data storage device, and the like.

In exemplary embodiments, there is also provided a non-transitory computer-readable storage medium including instructions that, when executed by a processor of a mobile terminal, enables the mobile terminal to perform the above-described method for image display. The method may include: obtaining display definition information of an image to be displayed; determining a target image compression ratio corresponding to the display definition information of the image to be displayed based on a prestored correspondence between display definition information and image compression ratios; and compressing display data of the image to be displayed based on the target image compression ratio, and transmitting the compressed display data to a display device for display.

Alternatively or additionally, transmitting the compressed display data to the display device for display may include: saving the compressed display data to a cache of the display device; retrieving the compressed display data from the cache and decompressing the compressed display data; and driving the display device to display the image to be displayed based on the decompressed display data.

Alternatively or additionally, the display definition information is a display definition level; obtaining the display definition information of the image to be displayed may include: obtaining an original resolution of the image to be displayed; determining, based on the prestored correspondence between display definition information and image compression ratios, a display definition level corresponding to a resolution range including the original resolution as the display definition level of the image to be displayed; or obtaining the display definition level of the image to be displayed chosen by a user.

Alternatively or additionally, determining the target image compression ratio corresponding to the display definition information of the image to be displayed based on the prestored correspondence between display definition information and image compression ratios, may include: determining the target image compression ratio corresponding to the display definition information of the image to be displayed as 1, if the display definition information of the image to be displayed is a highest display definition level and capacity of the cache of the display device is greater than or equal to a frame data size of the display data; and determining the target image compression ratio corresponding to the display definition information of the image to be displayed as a ratio of the capacity of the cache of the display device to the frame data size of the display data, if the display definition information of the image to be displayed is the highest display definition level and the capacity of the cache of the display device is less than the frame data size of the display data.

Alternatively or additionally, compressing display data of the image to be displayed based on the target image compression ratio, and transmitting the compressed display data to the display device for display, may include: if the target image compression ratio is not 1, compressing the display data of the image to be displayed based on the target image compression ratio; saving the compressed display data to the cache of the display device; retrieving the compressed display data from the cache and decompressing the compressed display data; and driving the display device to display the image to be displayed based on the decompressed display data; the method further comprising: driving the display device to display the image to be displayed based directly on the display data of the image to be displayed, if the target image compression ratio is 1.

Alternatively or additionally, the method may further include: determining the target image compression ratio corresponding to the display definition information of the image to be displayed as a preset low compression ratio, if the display definition information of the image to be displayed is a second display definition level; determining the target image compression ratio corresponding to the display definition information of the image to be displayed as a preset middle compression ratio, if the display definition information of the image to be displayed is a third display definition level; and determining the target image compression ratio corresponding to the display definition information of the image to be displayed as a preset high compression ratio, if the display definition information of the image to be displayed is a fourth display definition level; wherein the highest display definition level is higher than the second display definition level, the second display definition level is higher than the third display definition level, and the third display definition level is higher than the fourth display definition level.

Alternatively or additionally, the method may further include: receiving a request for setting a compression ratio, the request for setting the compression ratio carries display definition information to be set and an image compression ratio to be set; and updating the correspondence between display definition information and image compression ratios based on the display definition information to be set and the image compression ratio to be set.

Embodiments of the present disclosure may include obtaining display definition information of an image to be displayed; determining a target image compression ratio corresponding to the display definition information of the image to be displayed based on a prestored correspondence between display definition information and image compression ratios; and compressing display data of the image to be displayed based on the target image compression ratio, and transmitting the compressed display data to a display device for display. Thus, users may select to compress the display data in a higher level when there is no need for a high image quality, so as to reduce the size of the data to be transmitted, which may reduce the power consumption for image display.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. The specification and embodiments are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A method for image display, comprising:
obtaining, by a device including a graphics processor and a display device electronically connected to the graphics processor, display definition information of an uncompressed image to be displayed on a Liquid Crystal Display Module (LCM) in the display device, the display device comprising a cache connected between the graphics processor and the LCMs;
determining, by the device, a target image compression ratio corresponding to the display definition information of the uncompressed image to be displayed based on a prestored correspondence between display definition information and image compression ratios and based on a comparison of a capacity of the cache and a frame data size of display data; and
compressing, by the device, the display data of the uncompressed image to be displayed based on the target image compression ratio, and transmitting the compressed display data to the display device for display.

2. The method of claim 1, wherein transmitting the compressed display data to the display device for display comprises:
saving the compressed display data to the cache of the display device;
retrieving the compressed display data from the cache and decompressing the compressed display data; and
driving the display device to display the image to be displayed based on the decompressed display data.

3. The method of claim 1, wherein the display definition information is a display definition level; and
wherein obtaining the display definition information of the uncompressed image to be displayed comprises:
obtaining an original resolution of the uncompressed image to be displayed; determining, based on the prestored correspondence between display definition information and image compression ratios, a display definition level corresponding to a resolution range including the original resolution as the display definition level of the image to be displayed.

4. The method of claim 3, wherein determining the target image compression ratio corresponding to the display definition information of the image to be displayed based on the prestored correspondence between display definition information and image compression ratios and based on a comparison of a capacity of the cache and a frame data size of display data, comprises:
- determining the target image compression ratio corresponding to the display definition information of the image to be displayed as 1, when the display definition information of the image to be displayed is a highest display definition level and capacity of the cache of the display device is greater than or equal to a frame data size of the display data; and
- determining the target image compression ratio corresponding to the display definition information of the image to be displayed as a ratio of the capacity of the cache of the display device to the frame data size of the display data, when the display definition information of the image to be displayed is the highest display definition level and the capacity of the cache of the display device is less than the frame data size of the display data.

5. The method of claim 4, wherein compressing display data of the image to be displayed based on the target image compression ratio, and transmitting the compressed display data to the display device for display, comprises:
- if the target image compression ratio is not 1, compressing the display data of the image to be displayed based on the target image compression ratio; saving the compressed display data to the cache of the display device; retrieving the compressed display data from the cache and decompressing the compressed display data; and driving the display device to display the image to be displayed based on the decompressed display data;
- the method further comprising:
- driving the display device to display the image to be displayed based directly on the display data of the image to be displayed, if the target image compression ratio is 1.

6. The method of claim 4, the method further comprising:
- determining the target image compression ratio corresponding to the display definition information of the image to be displayed as a preset low compression ratio, if the display definition information of the image to be displayed is a second display definition level;
- determining the target image compression ratio corresponding to the display definition information of the image to be displayed as a preset middle compression ratio, if the display definition information of the image to be displayed is a third display definition level; and
- determining the target image compression ratio corresponding to the display definition information of the image to be displayed as a preset high compression ratio, if the display definition information of the image to be displayed is a fourth display definition level;
- wherein the highest display definition level is higher than the second display definition level, the second display definition level is higher than the third display definition level, and the third display definition level is higher than the fourth display definition level.

7. The method of claim 1, the method further comprising:
- receiving a request for setting a compression ratio, the request for setting the compression ratio carries display definition information to be set and an image compression ratio to be set; and
- updating the correspondence between display definition information and image compression ratios based on the display definition information to be set and the image compression ratio to be set.

8. A device for image display, comprising:
- a processor and a display device electronically connected to the processor;
- a memory for storing instructions, which are executable by the processor; and
- a cache connected between the processor and a Liquid Crystal Display Module (LCM);
- wherein the processor is configured to:
- obtain display definition information of an uncompressed image to be displayed on the LCM;
- determine a target image compression ratio corresponding to the display definition information of the uncompressed image to be displayed based on a prestored correspondence between display definition information and image compression ratios and based on a comparison of a capacity of the cache and a frame data size of display data; and
- compress display data of the uncompressed image to be displayed based on the target image compression ratio, and transmit the compressed display data to the display device for display.

9. The device of claim 8, wherein the processor is configured to:
- save the compressed display data to the cache of the display device;
- retrieve the compressed display data from the cache and decompress the compressed display data; and
- drive the display device to display the image to be displayed based on the decompressed display data.

10. The device of claim 8, wherein the display definition information is a display definition level;
- the processor is configured to:
- obtain an original resolution of the uncompressed image to be displayed; determine, based on the prestored correspondence between display definition information and image compression ratios, a display definition level corresponding to a resolution range including the original resolution as the display definition level of the uncompressed image to be displayed.

11. The device of claim 10, wherein the processor is configured to:
- determine the target image compression ratio corresponding to the display definition information of the image to be displayed as 1, when the display definition information of the image to be displayed is a highest display definition level and capacity of the cache of the display device is greater than or equal to a frame data size of the display data; and
- determine the target image compression ratio corresponding to the display definition information of the image to be displayed as a ratio of the capacity of the cache of the display device to the frame data size of the display data, when the display definition information of the image to be displayed is the highest display definition level and the capacity of the cache of the display device is less than the frame data size of the display data.

12. The device of claim 11, wherein the processor is configured to:
- if the target image compression ratio is not 1, compress the display data of the image to be displayed based on the target image compression ratio; save the compressed display data to the cache of the display device; retrieve the compressed display data from the cache and decompress the compressed display data; and drive the display device to display the image to be displayed based on the decompressed display data;

the device further comprising:

a display module configured to drive the display device to display the image to be displayed based directly on the display data of the image to be displayed if the target image compression ratio is 1.

13. The device of claim 11, wherein the processor is further configured to:

determine the target image compression ratio corresponding to the display definition information of the image to be displayed as a preset low compression ratio, if the display definition information of the image to be displayed is a second display definition level;

determine the target image compression ratio corresponding to the display definition information of the image to be displayed as a preset middle compression ratio, if the display definition information of the image to be displayed is a third display definition level; and determine the target image compression ratio corresponding to the display definition information of the image to be displayed as a preset high compression ratio, if the display definition information of the image to be displayed is a fourth display definition level;

wherein the highest display definition level is higher than the second display definition level, the second display definition level is higher than the third display definition level, and the third display definition level is higher than the fourth display definition level.

14. The device of claim 8, wherein the processor is further configured to:

receive a request for setting a compression ratio, the request for setting the compression ratio carries display definition information to be set and an image compression ratio to be set; and update the correspondence between display definition information and image compression ratios based on the display definition information to be set and the image compression ratio to be set.

15. A non-transitory computer-readable storage medium having stored therein instructions that, when executed by a processor of a device, causes the device to perform acts comprising:

obtaining display definition information of an uncompressed image to be displayed on a Liquid Crystal Display Module (LCM) that is connected to a cache and the processor;

determining a target image compression ratio corresponding to the display definition information of the uncompressed image to be displayed based on a prestored correspondence between display definition information and image compression ratios and based on a comparison of a capacity of the cache and a frame data size of display data; and compressing display data of the uncompressed image to be displayed based on the target image compression ratio, and transmitting the compressed display data to a display device for display.

16. The non-transitory computer-readable storage medium of claim 15, wherein the display definition information is a display definition level; and wherein obtaining the display definition information of the uncompressed image to be displayed comprises:

obtaining an original resolution of the uncompressed image to be displayed; determining, based on the prestored correspondence between display definition information and image compression ratios, a display definition level corresponding to a resolution range including the original resolution as the display definition level of the uncompressed image to be displayed.

17. The non-transitory computer-readable storage medium of claim 16, wherein the acts further comprise:

determining the target image compression ratio corresponding to the display definition information of the image to be displayed as 1, when the display definition information of the image to be displayed is a highest display definition level and capacity of the cache of the display device is greater than or equal to a frame data size of the display data.

18. The non-transitory computer-readable storage medium of claim 17, wherein the acts further comprise:

determining the target image compression ratio corresponding to the display definition information of the image to be displayed as a ratio of the capacity of the cache of the display device to the frame data size of the display data, when the display definition information of the image to be displayed is the highest display definition level and the capacity of the cache of the display device is less than the frame data size of the display data.

* * * * *